W. GAMBONI.
RAILWAY CAR HOSE COUPLING.
APPLICATION FILED AUG. 14, 1912.
1,061,908.
Patented May 13, 1913.
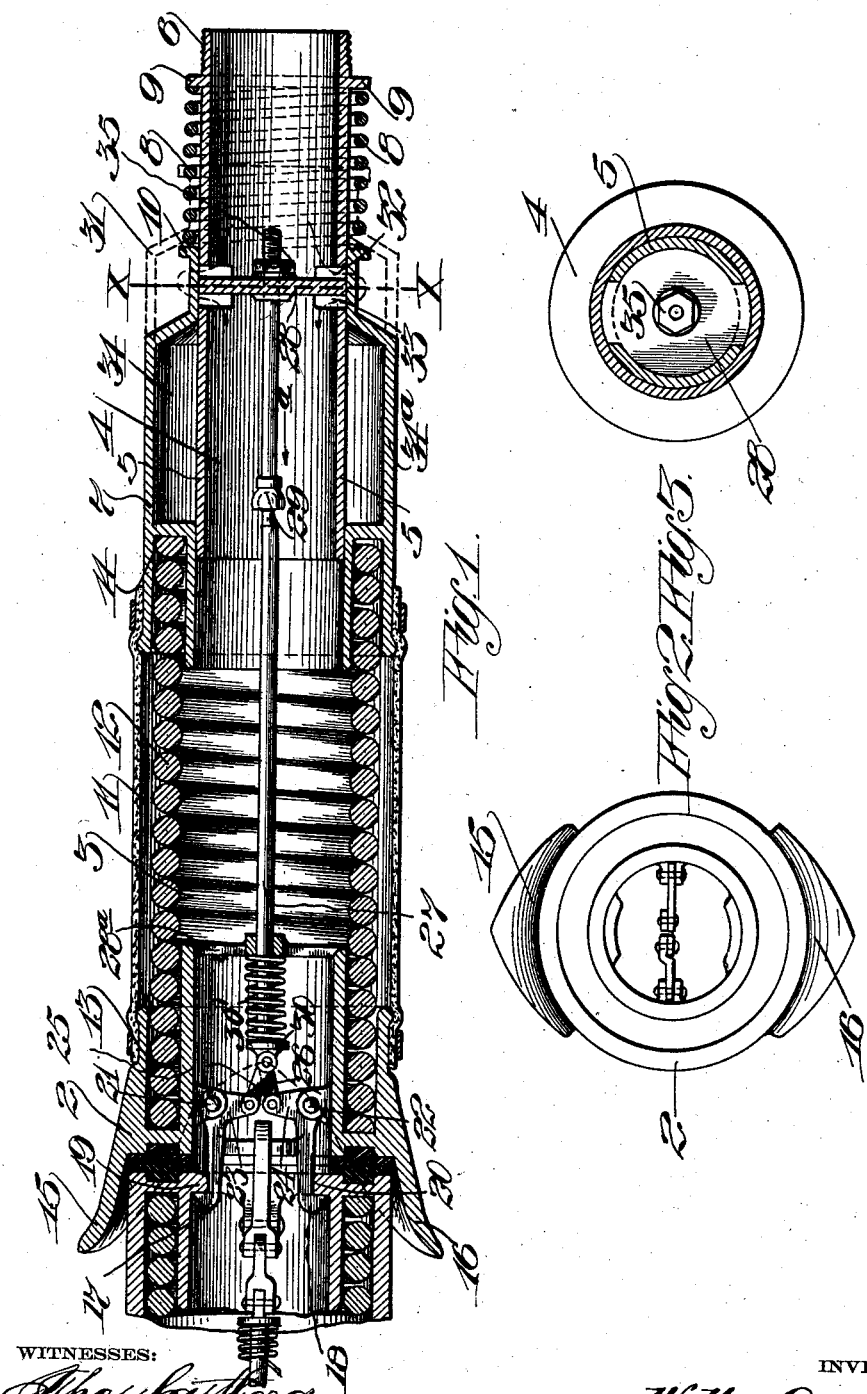
WITNESSES:
INVENTOR
Walter Gamboni
BY G. H. Strong
his ATTORNEY

UNITED STATES PATENT OFFICE.

WALTER GAMBONI, OF OLEMA, CALIFORNIA.

RAILWAY-CAR HOSE-COUPLING.

1,061,908.  Specification of Letters Patent.  Patented May 13, 1913.

Application filed August 14, 1912. Serial No. 715,037.

*To all whom it may concern:*

Be it known that I, WALTER GAMBONI, a citizen of the United States, residing at Olema, in the county of Martin and State of California, have invented new and useful Improvements in Railway-Car Hose-Couplings, of which the following is a specification.

This invention relates to certain new and useful improvements in automatic pipe couplings, and is particularly designed for coupling the air pipes, arranged to carry compressed air from one car to another in a railway train, for the purpose of operating brakes and the like.

The object of the present invention is to provide a simple, substantial and reliable coupling which will automatically couple when two cars are brought together, and which will always register no matter which of the ends of the cars are coupled, and which will automatically separate in case the train should break in two, or when it is desired to separate the cars.

Another object is to provide a coupling of this type, having means for holding the couplings together with a substantially constant pressure, regardless of the running in or out of the drawbar slack, or other causes.

A further object of the invention is to provide an automatic air cut-off, so positioned in the coupling that it will automatically close the air flow through the coupling when the cars are separated, thus eliminating separate air valves, and which will also automatically open when the cars are brought together and the couplings connected, thus opening the air line through the train.

The invention further consists in details of construction which will be more fully explained by reference to the accompanying drawings, in which—

Figure 1 is a longitudinal section showing one coupling and a part of another coupling interlocked. Fig. 2 is an end view looking into the mouth of the coupler with the gasket removed. Fig. 3 is a section on line X—X of Fig. 1.

The invention relates to the class of pipe couplings used for uniting any of the pipe lines passing through the train, as the heating line, air brake, or signal pipes, wherein the respective heads of the couplings engage automatically as the cars are brought together.

Referring to Fig. 1 of the drawings, it will be understood that all the couplers on the train line or at either end of the car are exactly alike, so that the explanation and description of one will cover all of them. The coupler consists of a head portion 2, a flexible portion 3, and a telescoping portion generally indicated at 4. The telescoping portion of the coupling consists of a stationary tube or pipe 5, threaded at one end, as at 6, which end may be secured or connected in any suitable manner to the car body pipe line running from one end of the car to the other. The stationary pipe 5 is surrounded by a telescoping member 7, slidably mounted on the outside of the stationary tube 5 and normally held in the position shown in Fig. 1; the telescoping member 7 being held in this position by the pressure of a coil spring 8 surrounding the stationary pipe and exerting its pressure against a stationary flange 9 on the pipe 5 and a flange 10 on the telescoping member 7, thus holding the telescoping member in its normal position. The coupling head 2 and the telescoping member 7 are connected by a flexible fluid-tight tube, as a rubber hose 11, and is held in extended position by a heavy coil spring 12; the coupling head 2 and the telescoping member 7 being provided with annular seat portions 13 and 14 for the reception of the spring 12. The spring 12 being heavy will always hold the coupling head in a certain position or in alinement with the telescoping member. The flexible tube 11 surrounding this will form a fluid-tight connection between the coupling head and the telescoping part, at the same time producing a flexible connection between the two. This is very essential, as the flexible connection will prevent any unfolding, rocking or lateral motion of the coupling heads when rounding sharp curves. Each coupling head proper is provided with two guide members or flanges 15 and 16, provided for the purpose of guiding the end portions of the two different couplings into juxtaposition with each other when the cars are brought together. This obviates the necessity of a brakeman being present to see that a good connection is made when the cars are brought together. The two coupling heads, when brought together, are interlocked by latches, as shown at 17 and 18; the latches on one coupling head being adapted to interlock with flanges 19 and 20 in the opposite coupling head, and the latches on the opposite coupling head being adapted to interlock with the flanges of the first-named coupling head, which is partly shown in Fig. 1 of the drawings. The interlocking latches are so mounted in the coupling heads that they will always assume right angle positions with relation to each other.

The latches are shown as pivoted at 21 and 22, and are provided with crank arms 23 and 24 which are connected by links 25 and 26 with a rod 27, slidably mounted in a stationary member 28 forming a part of the stationary tube 5. The rod 27 is provided with a socket or universal joint 29 for the purpose of allowing flexibility of the rod when the coupling is rounding curves. It is also provided with a collar 30, between which and the stationary member 28ª a coil spring 30' is mounted, so that it will exert its pressure on the rod 27 and hold the latches 17 and 18 in a locked position with the flanges 19 and 20 of the opposite coupling; it being understood that the opposite coupling is similarly constructed and that the latches carried by that coupling are similarly acted upon.

The telescoping portion of each coupling is provided for two separate purposes. First, the distance between two cars is such that when two cars are brought together the coupling heads will interlock and the telescoping part of the couplers may be partly compressed against the pressure of the springs 8 into the position shown by dotted lines at 31. This will allow for any drawbar slack and also allows the springs 8 to exert a constant pressure on the coupling heads. The rod 27, being connected, as here shown, to the latches through the medium of the links 25 and 26, will be forced back, together with the coupling head, being permitted to slide through the stationary members 28 and 28ª. The spring surrounding the rod and acting against the collar 30 will naturally be more or less compressed under this condition and will only act to exert more pressure on the latches 17 and 18 to hold these in their locked positions. Second, the function performed by the telescoping of member 7 upon the stationary tube 5 into the dotted line position shown at 31 will be as follows: The member 28 is cast integral or formed in one piece with the stationary tube 5, and is so positioned and shaped that it will entirely fill the tube 5 and close the passage through the tube. In order to allow air to pass through the tube it is necessary to create a by-pass. This is accomplished by forming cut-away portions or ports 32 and 33 in the tube 5. These ports are closed by the telescoping member 7 when this is in its normal position, which is assumed when the heads are uncoupled. This eliminates valve connections of any kind. However, the moment two couplers are connected by bringing the cars together, and the telescoping members assume the position shown by dotted lines, the sleeve portion 33ª of the telescoping member 7 is moved back into such a position that the air can escape from one port through the hollow portion 34 of the telescoping member down through the opposite port 32. This creates a by-pass and allows air to rush through the coupling which will only take place when the couplings and cars are connected, as this is the only time that the sleeve portion 34ª of the telescoping member is in such a position that air can by-pass through the ports 32 and 33.

When it is desired to disconnect the cars, it is only necessary to uncouple the main couplings. All automatic couplings connecting the air brake or signal lines of the construction here shown will be automatically uncoupled by the pulling apart of the cars. This is accomplished in the following manner: The rod 27 is provided with a nut 35. This limits the outward movement of the rod 27 in the direction of arrow $a$. The moment this position has been assumed and a pull is exerted on the couplings, it can be seen that the rod will actuate the latches by pulling on the links 25 and 26, connected with the crank portions 22 and 24 so as to rock the latches and disengage these from the interlocking flanges 19 and 20. This will allow the coupling heads to separate.

The car coupling is substantial in construction and reliable in its actions and takes no more space than the ordinary coupling. The materials and finish of the several parts may be such as experience and judgement of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. An automatic hose coupling for railway cars comprising coupling heads having flaring wings to guide the coupling heads into position when the cars are brought together and the coupling heads are to be interlocked, means for automatically locking the coupling heads together, flexible fluid conductors connecting the coupling heads with telescoping members secured to the cars, and means controlled by the telescoping members for automatically opening or closing the air line when the couplings are connected or disconnected.

2. An automatic hose coupling for railway cars comprising coupling heads having flaring wings to guide the coupling heads into position when the cars are brought together and the coupling heads are to be interlocked, means for automatically locking the coupling heads together, means for automatically unlocking the coupling heads when the cars are parted, flexible fluid conductors connecting the coupling heads with telescoping members secured to the cars, and means controlled by the telescoping members for automatically opening or closing the air line when the couplings are connected or disconnected.

3. An automatic hose coupling for railway cars comprising coupling heads having flaring wings to guide the coupling heads into position when the cars are brought together and the coupling heads are to be interlocked, spring-actuated latches in each coupling head adapted to automatically interlock with flanges in the opposite coupling head when the heads are brought together, means for automatically releasing the latches when the cars are parted, flexible fluid conductors connecting the coupling heads with telescoping members secured to the cars, and means controlled by the telescoping members for automatically opening or closing the air line when the couplings are connected or disconnected.

4. An automatic hose coupling for railway cars comprising coupling heads having flaring wings to guide the coupling heads into position when the cars are brought together and the couplings are to be interlocked, flanges formed on the inner periphery of the coupling heads, spring-actuated latches in each coupling head adapted to automatically interlock with the flanges in the opposite coupling head when the heads are brought together, means for automatically releasing the latches when the cars are parted, flexible fluid conductors connecting the coupling heads with telescoping members secured to the cars, a plurality of by-pass ports in said telescoping members, and means controlled by the telescoping members for automatically opening or closing the air line when the couplings are connected or disconnected, said means comprising annular sleeves actuated by the telescoping members, said sleeves adapted to open or close the by-pass ports forming communication between the telescoping members and the coupling proper.

5. An automatic hose coupling for railway cars comprising coupling heads having flaring wings to guide the coupling heads into position when the cars are brought together and the couplings are to be interlocked, flanges formed on the inner periphery of the coupling heads, spring-actuated latches in each coupling head adapted to automatically interlock with the flanges in the opposite coupling head when the heads are brought together, links connecting the latches with flexible rods actuated to release the latches when the cars are parted, flexible fluid conductors connecting the coupling heads with telescoping members secured to the cars, a plurality of by-pass ports in said telescoping members, and means controlled by the telescoping members for automatically opening or closing the air line when the couplings are connected or disconnected, said means comprising annular sleeves actuated by the telescoping members, said sleeves adapted to open or close the by-pass ports forming communication between the telescoping members and the coupling proper.

In testimony whereof I have hereunto set my hand in the presence of two subscribing witnesses.

WALTER GAMBONI.

Witnesses:
JOHN H. HERRING,
IRVINE SINNETT.

---

Copies of this patent may be obtained for five cents each, by addressing the "Commissioner of Patents, Washington, D. C."